3,379,737
EPOXIDE PRODUCTION

Anthony Rustin, Shawinigan, Quebec, and Jamshid Varjavandi and Ernest R. Hayes, Shawinigan South, Quebec, Canada, assignors to Shawinigan Chemicals Limited, Montreal, Quebec, Canada, a corporation of Canada No Drawing. Continuation-in-part of application Ser. No. 249,135, Jan. 3, 1963. This application May 29, 1963, Ser. No. 284,001

4 Claims. (Cl. 260—348.5)

This application is a continuation-in-part of copending application Ser. No. 249,135, filed Jan. 3, 1963, and now abandoned.

This invention relates to the production of epoxides from olefins. More particularly, it relates to the continuous epoxidation of olefins by peracetic acid formed in situ from acetaldehyde and oxygen.

Epoxides are valuable intermediates in many chemical processes. They can be isomerized to give carbonyl compounds and unsaturated alcohols, or reacted with acids, alcohols, amines, and similar substances to form a variety of useful derivatives. Some can be polymerized into polyoxyalkylene compounds which have found wide usage in synthetic detergent and lubricating compositions. Additionally, many substituted epoxides are excellent plasticizers for polyvinyl chloride resins.

The epoxidation of olefinically unsaturated compounds with peracetic acid is known. However, such oxidation has certain disadvantages. Peracetic acid is extremely dangerous at high temperatures, and may explode violently when present in appreciable concentrations. Also at high temperatures, by-product acetic acid tends to react with the product epoxide to give the corresponding glycol monoacetate, thus reducing the yield of epoxide produced. Most processes attempt to circumvent these disadvantages by either employing special reactor designs or else by using relatively low temperatures, as for example, below about 80° C. The reaction proceeds very slowly with many common olefins at these low temperatures, so that contact times of several hours are necessary for commercial yields.

Acetaldehyde monoperacetate has also been considered as an epoxidizing agent for unsaturated compounds. In this method, the oxidizing agent must be prepared beforehand at temperatures below 15° C., and must be stored at temperatures below 0° C. Acetaldehyde monoperacetate decomposes rapidly above about 20° C. and peracetic acid decomposes above approximately 50° C. The violent decomposition of these compounds when overheated makes their storage and use extremely hazardous.

Accordingly it is an object of the present invention to provide a method for the epoxidation of epoxidizable olenfinically unsaturated compounds containing at least three carbon atoms. It is a further object of the invention to provide a continuous method of epoxidation which is operable at relatively high temperatures, and which gives commercially acceptable yields of epoxides with reactant residence times of less than one hour. An additional object is the provision of a continuous epoxidation method which uses inexpensive starting materials and produces, in addition to epoxides, acetic acid as a commercially desirable by-product. Other objects will become evident from the disclosure to follow.

The invention consists in a process for the production of an epoxide having at least three carbon atoms and of acetic acid which comprises (a) continuously passing a liquid comprising acetaldehyde and at least one olefinically unsaturated compound having at least three carbon atoms into a reaction vessel to form at least one liquid phase therein in the presence of a catalyst selected from the group consisting of the chloride and bromide salts of copper, cobalt and iron, and mixtures of the chloride and bromide salts of any one of copper, cobalt, and iron and optionally in the presence of an inert diluent liquid, (b) continuously introducing an oxygen containing gas into said liquid phase while maintaining said liquid phase at a temperature within the range 35–225° C., (c) continuously removing a portion of said liquid phase and (d) recovering an epoxide and acetic acid from the removed portion.

The present process is thus a single-stage one, in which acetaldehyde, oxygen and an olefinically unsaturated compound are introduced with a catalyst into a reactor maintained between 35 and 225° C. Among the catalysts used are those which have been known in the art for the production of peracetic acid from acetaldehyde at temperatures ranging up to 50° C. It is totally unexepcted however, considering the low decomposition temperatures of peracetic acid, that such peracetic acid should be formed in the liquid phase at the high temperatures of the present process. Although it is not desired to limit the invention to any theory of reaction mechanism, it is believed that peracetic acid is formed within the reaction mixture, and that the peracetic acid which does not react with the olefinically unsaturated compound to form an epoxide decomposes almost immediately into acetic acid and oxygen, due to the high temperatures in the reactor. When propylene is used as the olefinically unsaturated compound, some propylene is also believed to be oxidized to acetaldehyde which is then further oxidized to acetic acid.

The reaction is strongly exothermic, and may go out of control if adequate cooling means are not provided. Cooling can be aided by suitably diluting the reactants, so that the heat produced is dispensed through a large volume of material and may thus be more readily dissipated. Such dilution is also useful to reduce the possibility of side reactions which might otherwise occur at the higher reaction temperatures as, for example, the recation of the product epoxides with the by-product acetic acid to form glycol mono- and diacetates.

Dilution can be accomplished either by using an excess of olefinically unsaturated compound or of acetaldehyde, or by continuously passing an inert organic diluent into the reactor simultaneously with the other reactants. It is usually desirable to use a diluent in which the catalyst employed can be dissolved, as this provides a convenient method for the continuous addition of catalyst. It is also desirable that the diluent be at least partially miscible with both the acetaldehyde and olefin, so that it can serve the additional purpose of improving the contacting of reactant. Naturally, any organic diluent used should be inert with respect to the other ingredients; for example, acids should not be used because they might attack the epoxide ring of the desired epoxide product, and non-aromatic olefinically-unsaturated compounds are not usable unless their epoxides are a desired product of the process. Suitable diluents include saturated aliphatic hydrocarbons such as heptane or cyclohexane; aromatics such as benzene and xylene, saturated esters such as methyl acetate, alcohols such as n-heptanol, kentones such as methyl ethyl ketone, acetals such as methylal, saturated alcohol-ethers such as the liquid polyethylene glycols, and mixtures of two or more compounds from the above-mentioned classes.

The catalyst used in this process is a chloride and/or bromide salt of copper or of cobalt or of iron. Mixtures of copper chloride and copper bromide are suitable, as are the mixtures of chloride and bromide of cobalt and mixtures of chloride and bromide of iron; however mixtures of the chlorides and/or bromides of two or more of the metals copper, cobalt and iron are unsuitable and should not be used. The catalyst concentration in the solution is not critical, as long as sufficient catalyst is present to catalyze the acetaldehyde oxidation. Preferred ranges of catalyst concentration are from 0.000125% to 0.125% by weight of the acetaldehyde present, although larger amounts of catalyst may sometimes be desirable. When a mixture of diluent, catalyst, and acetaldehyde containing 8% by weight acetaldehyde is used, this corresponds to a catalyst concentration based on the mixture of .00001 to .01%. Experiments have shown that some reaction occurs at catalyst concentrations below the preferred range, when only trace concentrations of catalyst are present. For example, small amounts of catalyst deposited on the reactor walls during operation at normal catalyst concentrations are sufficient to produce appreciable yields of product for several days thereafter, even if no more catalyst is added. Although it is normally preferred to introduce catalyst into the reactor as a solution in an organic liquid diluent, it is also possible to impregnate the catalyst upon a suitable support or to have it present as a finely divided solid suspension.

The shape of the reactor does not seem to be critical to the process of this invention. It is of course necessary to have adequate mixing of reactants. This may be accomplished by reactor design, the design of the oxygen spargers used, premixing of reactants, stirring means, or a combination of these expedients. In general the reactor does not need to be externally heated, as the reactions occurring within it are exothermic and provide sufficient heat to maintain the reaction temperature. Cooling means are necessary however, in order to keep the reaction from going out of control because of its exothermic nature. The reactor can be made from any conventional materials of construction which do not catalyze unwanted side reactions to any appreciable extent.

The epoxidation of olefinically unsaturated compounds according to the present process can be carried out over a wide range of temperatures. Some yields of epoxides can be obtained at temperatures as low as 35° C. and as high as 225° C. For commercial yields, it is prefered to operate at temperatures in the range 50–200° C. When the olefinically unsaturated compound is propylene, a specially preferred temperature range for high yields of propylene oxide is 100–140° C.

At all temperatures, reactant flow rates can be varied to give liquid reactant residence times (average hold-up times of liquid reactants within the reactor) of up to 60 minutes, but preferably below 45 minutes. It has been found that reactant hold-up times longer than 45 minutes tend to give lower yields of epoxides, possibly because of slow side reactions leading to by-product formation from the epoxide product. A preferred range of reactant residence times is from 3 to 25 minutes.

The olefinically unsaturated compound used as the feedstock in this reaction need not be pure; for example it can be mixed with saturated hydrocarbons of desired. Thus, a sweetened naphtha cut containing both olefins and paraffins of the same boiling range can be passed through the reactor without further separation. The examples show the use of monoolefins having 3 to 14 carbon atoms, i.e., propylene to tetradecene. The paraffins pass through the reactor unchanged, and can be recovered from the product stream for their fuel value. Also the unsaturated compound can be introduced into the reactor in admixture with a sitable organic solvent, as for example the same solvent which is used as diluent in the acetaldehyde/catalyst feed stream. The ratio of olefinically unsaturated compounds to acetaldehyde is not critical, and can be varied over wide ranges if desired. Considerable increase in epoxide formation (based on acetaldehyde conversion) is obtained when 100–600% excess of olefinically unsaturated compound is used, but the cost saving due to the increased efficiency is partially offset by the cost of recycling the unreacted excess reactant. Suitable olefinically unsaturated epoxidizable compounds for use in this process are aliphatic and alicyclic olefins, including those with more than one double bond in their structures; halogenated olefins; olefinically unsaturated carboxylic acids, esters, amines, nitriles, ketones and alcohols; and complex natural products containing olefinic unsaturation.

The rate at which oxygen is fed into the reactor is not critical to the process of this invention, and can be varied widely. It is usually preferred, however, to operate at flow rates which provide approximately the stoichiometric amount of oxygen necessary to form peracetic acid from the acetaldehyde being introduced into the reactor. Oxygen flow rates greater than this do not increase yields appreciably, and lead to large amounts of oxygen being present along with olefin vapors in the vapor space at the top of the reactor. Under such conditions, much nitrogen must be introduced into the reactor in order to prevent explosive mixtures being formed. If lower than stoichiometric ratios of oxygen to acetaldehyde are used, considerable acetaldehyde will pass through the reactor unoxidized, as insufficient oxygen will be present for complete oxidation.

The process of the present invention can be carried out over a wide range of pressures. Appreciable yields of epoxides can be obtained at atmospheric pressure by passing oxygen, an olefinically unsaturated compound, acetaldehyde, and catalyst into a nitrogen-blanketed reactor. It is usually preferred, however, to epoxidize normally gaseous olefins at a pressure higher than atmospheric pressure, so that they can be introduced into the reactor as liquids and can therefore mix more readily with the acetaldehyde-catalyst mixture. For example, it requires a pressure of about 10 atmospheres to liquefy propylene at a room temperature of about 20° C. It is therefore desirable, if propylene is used as the olefin, to run the reactor at pressures greater than 10 atmospheres, so that the unheated propylene feed may be passed into the reactor as a liquid. Pressurization of the reactor can conveniently be accomplished with a non-reactive gas such as nitrogen, which also serves to dilute the olefin vapors and oxygen above the liquid reaction mixture, thus reducing the possibility of explosion at higher reaction temperatures.

The reaction of olefinically unsaturated compounds with acetaldehyde and oxygen according to the process of the invention is believed to occur chiefly in the liquid phase. It is therefore necessary to choose the reaction temperature, pressure, and the diluent (if one is used) in such a way that a liquid phase will be present. If the diluent and one or more reactants are immiscible or only partially miscible, more than one liquid phase can exist in the reactor, but this does not adversely affect the process. It will be noted that the process can be carried out above the critical temperature of some of the reactants, if sufficient pressure is applied to cause them to dissolve in another reactant or a diluent.

One advantage of the present invention is the small amount of unwanted by-products produced. Most previously known olefin epoxidations using peracetic acid have produced large amounts of by-products such as alkylene glycols and their mono and diacetate derivatives. Analyses made during the epoxidation of propylene by the process of the present invention showed only trace amounts of these compounds. In typical periods of operation using propylene, oxygen, and an acetaldehyde-catalyst-diluent stream containing 8% acetaldehyde and 0.00215% $CoCl_2 \cdot 6H_2O$ catalyst by weight, careful analysis showed that less than 0.0015% by weight of the unpurified product stream was composed of propylene glycol and its mono and diacetate derivatives. Other by-products in the product stream were peracetic acid (0–0.3%), other peroxides such as diacetyl peroxide (0–0.4%), and methyl formate (0–0.2%). In general, lower concentrations of these by-products occurred in product streams from periods of operation at higher operating temperatures. Considerable amounts of acetic acid (7–11%) were found in the product streams of epoxidations at all temperatures. This valuable by-product is easily separable from propylene oxide and thus does not provide a serious source of product contamination. The only other by-products occurring to any extent were carbon oxides resulting from the combustion of propylene in the vapor space above the liquid level of the reactor. These carbon oxides accounted for an amount of carbon equivalent to less than 2.0% of the propylene entering the reactor.

Statements in the literature indicate that the direct oxidation of olefins by air may occur at the temperatures used in the present invention. Accordingly experiments were made to determine if propylene oxide could be made directly by oxidation of propylene with molecular oxygen under conditions of this invention. Initially, all conditions of the present process were fulfilled. Acetaldehyde, catalyst, oxygen, propylene, and diluent were continuously fed into a reactor, and propylene oxide was produced. When a steady state had been reached, the amount of acetaldehyde being passed into the reactor was gradually decreased. As the acetaldehyde feed decreased, reactor temperature could not be maintained without external heating and propylene oxide yield decreased. At one eighth of the normal acetaldehyde feed, no propylene oxide was detected in the product stream. A run in which no acetaldehyde was present at all gave no propylene oxide yield. These experiments show that the air oxidation of olefins does not occur to any significant extent during the process of this invention.

Example 1

The reactor used was a vertical aluminum lined steel tube 90 cm. long and 6.5 cm. in diameter, pressurized with nitrogen to about 21 atmospheres. A spiral shaped gas sparger near the bottom continuously supplied a nitrogen-oxygen mixture approximating the composition of air. A liquid product draw-off line was situated about 8 cm. from the top and a vapor draw-off led from the vapor space above the level of this line. The vapor leaving through this draw-off was passed through brine cooled condensers. Non-condensable gases were vented through a back pressure regulator, while condensables were recycled as liquid to the bottom of the reactor.

Two liquid inlet lines entered the bottom of the reactor. The first of these continuously supplied liquid propylene while the other continuously supplied a mixture of 8% acetaldehyde and 0.00215% $CoCl_2 \cdot 6H_2O$ catalyst in ethyl acetate diluent. (All percentages of acetaldehyde and catalyst in this and following examples are based on the weight of the total acetaldehyde-catalyst-diluent mixture, unless otherwise specified.) Flows were adjusted to provide for a 17¼ minute reactor residence time, and for a 1.3/1 propylene-acetaldehyde molar feed ratio. Oxygen flow was adjusted to a rate in stoichiometric proportion to the acetaldehyde for oxidation thereof to peracetic acid. The reactants were not preheated and reactor temperature was controlled solely by means of cooling coils.

The reactor was operated continuously for 12½ hours. Reactor temperature was altered at intervals during this period, in order to show the effects of various temperatures. Analyses of the liquid product drawn off after equilibrium had been achieved at the designated reaction temperatures indicated the composition of the liquid product to be as follows:

| Analyses (percent) | Reaction Temperature | |
|---|---|---|
|  | 122° C. | 142° C. |
| Propylene oxide | 3.86 | 3.78 |
| Diluent (ethyl acetate) | 85.5 | 85.3 |
| Acetic acid | 9.13 | 10.86 |
| Acetaldehyde | 0.35 | 0.23 |
| Propylene | 1.30 | 0.9 |
| Peracetic acid | Nil | Nil |
| Other peroxy compounds | 0.07 | Nil |
| Calculated propylene oxide Yield (on acetaldehyde reacted) | 44.5 | 43.8 |

In this and in following examples, the analyses for acetic acid, peracetic acid and other peroxides (calculated as diacetyl peroxide), were performed by volumetric methods. Analyses for other components were by gas-liquid chromatography. All analysis figures are weight percent.

In many examples, analysis results total slightly more are less than 100%, due chiefly to the difficulty of obtaining accurate chromatographic analyses of diluent concentration. The figures given for diluent concentrations are accurate only to about ±3%.

Example 2

The same reactor used in Example 1 was run continuously at a pressure of about 42 atmospheres for a period of eight hours. The same reactants, reactant concentrations, residence time, catalyst, and diluent as in Example 1 were used. The following results were obtained by analysis of the product streams:

| Analyses (percent) | Reaction Temperature | |
|---|---|---|
|  | 56° C. | 92° C |
| Propylene oxide | 2.30 | 2.94 |
| Diluent (ethyl acetate) | 85.0 | 84.0 |
| Acetic acid | 10.75 | 10.76 |
| Acetaldehyde | 0.425 | 0.35 |
| Propylene | 1.18 | 0.9 |
| Peracetic acid | 0.27 | 0.09 |
| Other peroxy compounds | 0.35 | 0.028 |
| Methyl formate | 0.04 | 0.16 |
| Calculated propylene oxide Yield (on acetaldehyde reacted) | 26.8 | 33.9 |

Example 3

The reactor described in Example 1 was operated continuously for 13½ hours at about 21 atmospheres pressure. 8% acetaldehyde and 0.00215% $CoCl_2 \cdot 6H_2O$ catalyst were introduced in ethyl acetate diluent, and propylene was introduced in a 1.3/1 molar ratio to acetaldehyde. A stoichiometric amount of oxygen was bubbled in as an oxygen-nitrogen mixture, as in Example 1. The feed rates were adjusted to give a residence time for liquid reactants of 37¼ minutes. At a reaction temperature of 96° C. the product stream had the following composition:

| | Percent |
|---|---|
| Propylene oxide | 1.79 |
| Diluent (ethyl acetate) | 88.0 |
| Acetic acid | 8.03 |
| Acetaldehyde | 0.24 |
| Propylene | 1.05 |
| Peracetic acid | 0.04 |
| Other peroxy compounds | 0.28 |
| Methyl formate | 0.05 |

The yield of propylene oxide based on acetaldehyde reacted was calculated to be 20.3%.

Example 4

The reactor used in Example 1 was thoroughly cleaned to remove catalyst from previous operations. It was then operated continuously for three hours at about 21 atmospheres pressure with an acetaldehyde-diluent-catalyst mixture containing 8% acetaldehyde and 0.00005% $CoCl_2 \cdot 6H_2O$ catalyst. Propylene was continuously introduced at a molar ratio of 1.3/1 with respect to acetaldehyde, and oxygen, in stoichiometric proportion for oxidation of the acetaldehyde to peracetic acid, was bubbled in mixed with nitrogen. The liquid reactant residence time was 17 minutes. After 1¼ hour operation at 120° C., a sample was taken which analyzed as follows:

|  | Percent |
|---|---|
| Propylene oxide | 2.56 |
| Diluent (ethyl acetate) | 89.0 |
| Acetic acid | 7.93 |
| Acetaldehyde | 0.90 |
| Peracetic acid | 0.04 |
| Other peroxy compounds | 0.21 |
| Propylene | 1.3 |
| Methyl formate | nil |

The yield of propylene oxide based on acetaldehyde reacted was calculated to be 32.0%.

Example 5

The reactor was a 6.5 cm. diameter aluminium lined steel tube which measured 35 cm. from the base to the liquid product draw-off. A vapor draw-off led from the space above the liquid level to the brine condensers described in Example 1. The reactor was pressurized with nitrogen to about 21 atmospheres pressure.

Liquid propylene and ethyl acetate diluent containing 8% acetaldehyde and 0.00215% $CoCl_2 \cdot 6H_2O$ catalyst were introduced continuously into the bottom of the reactor in a 1/1 molar acetaldehyde/propylene ratio. Pure oxygen was bubbled into the bottom of the reactor in stoichiometric proportion for oxidation of the acetaldehyde to peracetic acid. Liquid reactant flow rates were adjusted to give a residence time in the reactor of six minutes, and the reactor was run for 4½ hours. A sample taken after 1½ hours operation at 150° C. analyzed as follows:

|  | Percent |
|---|---|
| Propylene oxide | 1.84 |
| Diluent (ethyl acetate) | 87.5 |
| Acetic acid | 7.57 |
| Acetaldehyde | 0.20 |
| Propylene | 0.7 |
| Peracetic acid | 0.05 |
| Other peroxy compounds | 0.07 |
| Methyl formate | 0.10 |

The calculated propylene oxide yield on acetaldehyde reacted was 20.6%.

Example 6

The reactor described in Example 5 was used, with the same reactants, reactant ratios and catalyst as in that example, for a 5½ hour run at a six minute's reactant residence time. At a reaction temperature of 200° C., the product stream had the following composition:

|  | Percent |
|---|---|
| Propylene oxide | 1.56 |
| Diluent (ethyl acetate) | 88.5 |
| Acetic acid | 10.4 |
| Acetaldehyde | 0.32 |
| Peracetic acid | nil |
| Other peroxy compounds | nil |
| Propylene | 0.8 |
| Methyl formate | nil |

The calculated propylene oxide yield on acetaldehyde reacted was 17.3%.

Example 7

The reactor used was identical to that of Example 1, but was packed with glass beads to increase the degree of reactant mixing. The volume of liquid which could be held by the reactor in its packed state was about 1165 ml. Liquid propylene and ethyl acetate diluent containing 8% acetaldehyde and 0.00215% $CoCl_2 \cdot 6H_2O$ catalyst were passed continuously into the reactor in a propylene/acetaldehyde molar ratio of 1.3/1. An oxygen-nitrogen mixture was continuously bubbled in through the reactor bottom to provide oxygen in stoichiometric proportion for oxidation of the acetaldehyde to peracetic acid. The reactor was operated at 21 atmospheres pressure for five hours with a reactant residence time of 13¼ minutes. At a reaction temperature of 140° C. the product stream was composed as follows:

|  | Percent |
|---|---|
| Propylene oxide | 2.82 |
| Diluent (ethyl acetate) | 87.5 |
| Acetic acid | 10.11 |
| Acetaldehyde | 0.11 |
| Propylene | 0.7 |
| Peracetic acid | nil |
| Other peroxides | nil |
| Methyl formate.[1] |  |

[1] Not determined.

The yield of propylene oxide on acetaldehyde reacted was 31.4%.

Example 8

The reactor described in Example 1 was operated at a pressure of 21 atmospheres continuously for 3½ hours using acetone as diluent. Catalyst and acetaldehyde concentrations were respectively 0.00215% and 8% by weight of the total acetaldehyde-diluent-catalyst feed, and the propylene/acetaldehyde molar ratio was 1.3/1. These are identical concentrations and ratios as in Example 1, in order to provide a basis for comparison between the two examples. Oxygen was again bubbled in admixed with nitrogen, in stoichiometric proportion for oxidation of the acetaldehyde to peracetic acid. The reactant residence time was 16.6 minutes.

At a reactor temperature of 140° C., a partial analysis of the product stream showed:

|  | Percent |
|---|---|
| Propylene oxide | 2.4 |
| Acetic acid | 8.36 |
| Acetaldehyde | 0.65 |
| Peracetic acid | nil |
| Other peroxides | nil |

(Analyses were not made to determine the percentages of propylene and of diluent in the product stream.)

The yield of propylene oxide based on acetaldehyde reacted was calculated to be 28.9%.

Example 9

The reactor described in Example 1 was operated continuously for four hours at a pressure of about 21 atmospheres. The diluent was a 50/50 by volume mixture of acetone and benzene. The diluent-catalyst-acetaldehyde mixture contained 8% acetaldehyde and 0.00215% $CoCl_2 \cdot 6H_2O$ catalyst by weight.

Propylene was continuously introduced into the reactor in a molar ratio of 1.3/1 based on acetaldehyde. Oxygen was bubbled in mixed with nitrogen and in stoichiometric proportion for oxidation of the acetaldehyde to peracetic acid. The liquid reactant residence time was 16.6 minutes.

The temperature of the reactor was altered at intervals during the run in order to study the effects of temperature upon yield. At two typical temperatures, partial analysis of the product stream showed the following:

| Analyses (percent) | Reaction Temperature | |
|---|---|---|
|  | 100° C. | 140° C. |
| Propylene oxide | 2.15 | 3.9 |
| Acetic acid | 7.64 | 7.14 |
| Acetaldehyde | 0.80 | 0.65 |
| Peracetic acid | 0.05 | Nil |
| Other peroxy compounds | 0.28 | Nil |
| Yields of propylene oxide (based on acetaldehyde reacted) | 26.5 | 47.0 |

(Analyses were not made to find the percentage of propylene or of diluent in the mixture.)

Examples 10 and 11 show that chlorides and bromides of iron and copper can be used as catalysts in this invention. The reactor described in Example 1 was used in each of these examples, after cleaning to remove catalyst from previous operation which might still have been adhering to the reactor walls.

Example 10

A mixture of 0.00215% by weight or $FeCl_3 \cdot 6H_2O$, 8% by weight of acetaldehyde and balance ethyl acetate diluent was passed into the reactor continuously. Liquid propylene was passed into the reactor at a rate sufficient to give a 1.3/1 molar ratio of propylene to acetaldehyde. An oxygen-nitrogen mixture was bubbled into the reactor to provide oxygen in stoichiometric proportion for oxidation of the acetaldehyde to peracetic acid. The liquid reactant residence time was 17 minutes, and the reactor was operated at a pressure of about 21 atmospheres.

During a three-hour period of operation the following analyses of the product stream were made.

| Analyses (percent) | Reaction Temperature | |
|---|---|---|
| | 120° C. | 140° C. |
| Propylene oxide | 2.50 | 2.86 |
| Diluent (ethyl acetate) | 86.5 | 86.0 |
| Acetic acid | 8.71 | 9.26 |
| Acetaldehyde | 0.32 | 0.21 |
| Propylene | 0.9 | 0.5 |
| Peracetic acid | 0.14 | Nil |
| Other peroxy compounds | 0.07 | Nil |
| Methyl formate | Nil | Nil |
| Yields (calculated on acetaldehyde reacted) | 28.7 | 32.3 |

Example 11

A mixture of 0.00215% by weight of $CuBr_2$, 8% by weight of acetaldehyde and the balance ethyl acetate diluent was passed into the reactor continuously. Sufficient propylene was continuously passed in to give a propylene/acetaldehyde ratio of 1.3/1. A nitrogen-oxygen mixture was also bubbled into the reactor to provide oxygen in stoichiometric proportion for oxidation of the acetaldehyde to peracetic acid. The liquid reactant residence time was 17 minutes, and the reactor was operated at a pressure of about 21 atmospheres.

During a 2½ hour period of operation, product stream analyses gave the following results:

| Analyses (percent) | Reaction Temperature | |
|---|---|---|
| | 100° C. | 140° C. |
| Propylene oxide | 1.96 | 2.78 |
| Diluent (ethyl acetate) | 87.0 | 85.0 |
| Acetic Acid | 7.74 | 9.52 |
| Acetaldehyde | 0.77 | 0.27 |
| Propylene | 1.2 | 0.6 |
| Peracetic acid | 0.23 | Nil |
| Other peroxy compounds | Nil | Nil |
| Methyl formate | Nil | 0.08 |
| Yields (calculated on acetaldehyde reacted) | 24.1 | 31.7 |

In the foregoing examples, propylene oxide was identified and its concentration was found by chromatographic analyses. In order to show that propylene oxide could be isolated, the liquid products of several different periods of operation were combined and were distilled, using conventional apparatus. Infra-red analysis of fractions boiling near the boiling point of propylene oxide showed that these fractions consisted of propylene oxide of 80–90% purity.

Examples 12 and 13 show the process of the invention as carried out with a large excess of olefin present.

Example 12

Into the reactor described in Example 1 was continuously passed a mixture of 0.00215% by weight of $CoCl_2 \cdot 6H_2O$, 8% by weight of acetaldehyde, and balance ethyl acetate. Sufficient propylene was continuously passed in to give a propylene/acetaldehyde molar ratio of 4/1. A nitrogen-oxygen mixture was introduced to provide oxygen in stoichiometric proportion for oxidation of the acetaldehyde to peracetic acid. The reactor pressure was maintained at about 21 atmospheres, and flow rates were adjusted to give a liquid reactant residence time of 18.2 minutes.

During a 3½ hour period of operation at constant temperature of about 140° C., the product stream analyzed as follows:

| | Percent |
|---|---|
| Propylene oxide | 5.60 |
| Diluent (ethyl acetate) | 75.5 |
| Acetic acid | 10.5 |
| Acetaldehyde | 0.85 |
| Propylene | 4.12 |
| Peracetic acid | nil |
| Other peroxy compounds | nil |
| Methyl formate | 0.83 |

The yield of propylene oxide (based on acetaldehyde reacted) was 73.5%.

Example 13

A mixture of 0.00215% by weight of $CoCl_2 \cdot 6H_2O$, 8% by weight of acetaldehyde, and the balance ethyl acetate was passed continuously into the reactor described in Example 1. Propylene was continuously introduced in sufficient quantities to provide a propylene/acetaldehyde molar ratio of 7/1. A nitrogen-oxygen mixture was introduced in stoichiometric proportion for the oxidation of the acetaldehyde present to peracetic acid. Flow rates were adjusted to give an 18.2 minute liquid reactant resistance time, and the reactor pressure was maintained at about 21 atmospheres.

A 5½ hour run was carried out using the foregoing conditions. When equilibrium had been reached at a reaction temperature of 140° C., the product stream produced analyzed as follows:

| | Percent |
|---|---|
| Propylene oxide | 4.73 |
| Diluent (ethyl acetate) | 74.8 |
| Acetic acid | 9.94 |
| Acetaldehyde | 1.01 |
| Propylene | 7.02 |
| Peracetic acid | nil |
| Other peroxy compounds | 0.07 |
| Methyl formate | 0.68 |

The yield of propylene oxide (based on acetaldehyde reacted) was 68.5%.

The following examples show the process of the invention as applied to other olefinically unsaturated compounds.

Example 14

The reactor used was a glass tube 91.4 cm. in length with a diameter of 2.5 cm. It was surrounded by a water-glycol bath which could either heat or cool the reactor by heat transfer through the reactor wall. The bath was generally maintained at a temperature approximately 5–10° C. below the desired reaction temperature, to provide slight cooling action. Brine coils were located in the bath to provide emergency cooling if necessary. The reactor was suitably insulated externally to the water-glycol bath, and was equipped with a product stream recovery system similar to that described in Example 1. A recycle system for condensable vapors was also provided, as in Example 1. The reactor was pressurized to approximately 3.7 atmospheres by nitrogen introduced into the vapor space above the level of the liquid reactants.

A mixture of octene-2, acetaldehyde, ethyl acetate (as diluent), and catalyst was preheated to 35–40° C. and was then passed into the bottom of the reactor. A stoichiometric ratio of acetaldehyde to olefin was used, with the acetaldehyde forming about 8% by weight of the total mixture. The catalyst was $CoCl_2 \cdot 6H_2O$, and formed 0.00215% by weight of the total mixture. Oxygen was introduced into the bottom of the reactor through a separate inlet. Mixing of the oxygen with the liquid reactants was accomplished by providing the reactor, at about 3 cm. above the two inlets, with a perforated disc of polyfluoroethylene through which both oxygen and liquid reactants had to pass in intimate contact. Flow rates were adjusted to give a liquid reactant residence time of approximately 20 minutes and 30% excess oxygen over that theoretically needed to oxidize the acetaldehyde present to peracetic acid.

In a run of 4 hours duration, during which the results of reaction at several reaction temperatures were determined, the following analyses were obtained on the product stream after equilibruim had been reached in reaction at the indicated temperatures:

| Analyses (percent) | Reaction Temperature | |
|---|---|---|
| | 71° C. | 95° C. |
| Octene-2 oxide | 5.1 | 8.0 |
| Octene-2 | 10.1 | 10.1 |
| Acetic acid | 4.81 | 4.53 |
| Acetaldehyde | 0.98 | 0.98 |
| Peracetic acid | 0.20 | Nil |
| Other peroxides | Nil | Nil |
| Diluent (ethyl acetate) | N.D. | -------- |
| Yields (based on acetaldehyde reacted) | 26.0 | 53.2 |

N.D.—Not determined.

Example 15

A 6 hour run was made with ocetene-1 used as the olefin. All other conditions and flow rates were identical to those of Example 14. Analyses of the product stream at two reaction temperatures gave the following results:

| Analyses (percent) | Reaction Temperature | |
|---|---|---|
| | 68° C. | 95° C. |
| Octene-1 oxide | 3.5 | 4.3 |
| Octene-1 | 9.3 | 10.8 |
| Acetic acid | 6.84 | 6.30 |
| Acetaldehyde | 0.99 | 1.28 |
| Peracetic acid | Nil | Nil |
| Other peroxy compounds | Nil | Nil |
| Diluent (ethyl acetate) | N.D. | -------- |
| Yields (based on acetaldehyde reacted) | 18.0 | 28.5 |

N.D.—Not determined.

Example 16

A five hour run was made with tetradecene-1 used as the olefin. All other conditions and flow rates were identical to those of Example 14. Analysis of the product stream at two reaction temperatures was as follows:

| Analyses (percent) | Reaction Temperature | |
|---|---|---|
| | 75° C. | 97° C. |
| Tetradecene-1 oxide | 6.45 | 7.15 |
| Tetradecene-1 | 19.5 | 21.0 |
| Acetic acid | 6.2 | 4.90 |
| Acetaldehyde | 1.18 | 1.31 |
| Peracetic acid | Nil | Nil |
| Other peroxy compounds | 0.26 | Nil |
| Diluent (ethyl acetate) | N.D. | -------- |
| Yields (based on acetaldehyde reacted) | 18.0 | 22.5 |

N.D.—Not determined.

Example 17

Example 16 was repeated, using a 125% excess of tetradecene-1 over that theoretically needed to react with the acetaldehyde present, and a corresponding decrease in the amount of ethyl acetate diluent. All other conditions were identical to those of Example 16. Analysis of the product stream obtained at a reaction temperature at 104° C. gave the following:

| | Percent |
|---|---|
| Tetradecene-1 oxide | 8.96 |
| Tetradecene-1 | 73. |
| Acetic acid | 2.75 |
| Acetaldehyde | 0.79 |
| Peracetic acid | nil |
| Other peroxy compounds | 0.32 |

The yield of tetradecene-1 oxide, based on the acetaldehyde reacted, was calculated to be 38.5%.

Example 18

A stainless steel reactor identical in dimensions and fittings to the glass reactor described in Example 14 was used. A mixture of 8% acetaldehyde and 0.00215% $CoCl_2 \cdot 6H_2O$ catalyst in dodecene was added to the reactor in a continuous stream. (Percentages are by weight, based on the total weight of the mixture.) The catalyst was introduced into the mixture as a finely-divided suspension, and was kept uniformly suspended by continuously stirring the mixture prior to passing it into the reactor. Oxygen was bubbled into the bottom of the reactor in an amount 30% in excess of that theoretically required for the oxidation of the acetaldehyde present to peracetic acid. The reactor was pressurized to about 3.7 atmospheres with nitrogen. In a 4½ hour run using a 20 minute liquid reactant residence time, the following results were obtained:

| Analyses (percent) | Reaction Temperature | |
|---|---|---|
| | 85° C. | 107° C. |
| Dodecene-1 oxide | 6.3 | 6.65 |
| Dodecene-1 | 77.5 | 86.6 |
| Acetic acid | 4.12 | 4.29 |
| Acetaldehyde | 1.04 | 0.79 |
| Peracetic acid | Nil | Nil |
| Other peroxy compounds | Nil | 0.26 |
| Percent Yield (based on acetaldehyde reacted) | 17.4 | 25.0 |

(The yields shown in Examples 14–18 are corrected to allow for minor short term fluctuations in the ratio of acetaldehyde to olefin introduced into the reactor.)

Example 19

Soya bean oil was epoxidized in the reactor described in Example 18, using a feed stream composed of 8% acetaldehyde, 18.5% soya bean oil, 0.00215%

$$CoCl_2 \cdot 6H_2O$$

and balance ethyl acetate diluent. (Percentages are by weight.) The reactor was pressurized to about 3.7 atmospheres with nitrogen, and oxygen was introduced in an amount 30% in excess of that theoretically required to react with the acetaldehyde present. Feed rates were adjusted to give a liquid reactant residence time of 40 minutes. After equilibrium had been reached during a period of operation at 89° C., partial analysis of the product stream showed the presence of 4.7% epoxidized soya bean oil (based on oxirane oxygen determination), 6.35% acetic acid, and 1.15% acetaldehyde. No peracetic acid or other peroxides were detected.

Because an excess of acetaldehyde was used over that needed to react as peracetic acid with the soya bean oil present, no yield based on acetaldehyde reacted could be calculated. However, the percentage conversion of soya bean oil to epoxidized soya oil was found to be 25.4%.

It is understood that the foregoing examples and description merely illustrate specific embodiments of the invention, and do not limit its scope, which is as defined in the appended claims.

What is claimed is:

1. A process for the production of an olefin oxide having at least three carbon atoms which comprises contacting a liquid mixture containing acetaldehyde and an olefin having at least three carbon atoms at a temperature of from 50–200° C. with a gas containing molecular oxygen in the presence of a catalyst consisting of ferric chloride.

2. A process for the production of an epoxide having at least three carbon atoms which comprises (a) continuously introducing (1) acetaldehyde, (2) at least one epoxidizable olefinically unsaturated compound having at least three carbon atoms and (3) a diluent selected from the group consisting of said epoxidizable olefinically unsaturated compound and a substantially inert organic liquid diluent into a reaction vessel to form a liquid phase therein in the presence of a catalyst consisting of ferric chloride, said introduction being regulated to give a liquid residence time within the reaction vessel of less than 45 minutes, (b) continuously introducing a gas containing free oxygen into said liquid phase while maintaining said liquid phase at a temperature within the range 50–200° C., (c) continuously removing a portion of said liquid phase and (d) recovering an epoxide from the removed portion.

3. A process according to claim 2 wherein the reaction vessel is maintained at superatmospheric pressure and the liquid residence time within the reaction vessel is from 3 to 25 minutes.

4. A process according to claim 2 in which the organic liquid diluent is ethyl acetate or acetone.

References Cited

UNITED STATES PATENTS

| | | | |
|---|---|---|---|
| Re. 25,057 | 10/1961 | Stevens | 260—502 |
| 1,179,421 | 4/1916 | Galitzenstein et al. | 260—348.5 |
| 2,650,927 | 9/1953 | Gasson | 260—348.5 |
| 2,741,623 | 4/1956 | Millidge et al. | 260—348.5 |
| 2,314,385 | 3/1943 | Bludworth | 260—502 |
| 2,567,930 | 9/1951 | Findley et al. | 260—348.5 |
| 2,833,813 | 5/1958 | Wallace | 260—348.5 |
| 3,065,245 | 11/1962 | Latourette et al. | 260—342.5 |

FOREIGN PATENTS 820,461   9/1959   Great Britain.

NORMA S. MILESTONE, *Primary Examiner.*

N. RIZZO, *Examiner.*

J. P. FRIEDENSON, *Assistant Examiner.*